(12) United States Patent
Kaku

(10) Patent No.: US 11,424,957 B2
(45) Date of Patent: Aug. 23, 2022

(54) RELAY DEVICE

(71) Applicant: DENSO CORPORATION, Kariya (JP)

(72) Inventor: Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 79 days.

(21) Appl. No.: 16/800,460

(22) Filed: Feb. 25, 2020

(65) Prior Publication Data

US 2020/0313927 A1   Oct. 1, 2020

(30) Foreign Application Priority Data

Mar. 27, 2019 (JP) .............................. JP2019-060903

(51) Int. Cl.
| | | |
|---|---|---|
| *H04L 12/437* | (2006.01) | |
| *H04L 41/0654* | (2022.01) | |
| *H04B 7/14* | (2006.01) | |
| *H04L 43/0823* | (2022.01) | |
| *H04L 43/0811* | (2022.01) | |
| *H04L 41/0686* | (2022.01) | |

(52) U.S. Cl.
CPC ............. *H04L 12/437* (2013.01); *H04B 7/14* (2013.01); *H04L 41/0654* (2013.01); *H04L 41/0686* (2013.01); *H04L 43/0811* (2013.01); *H04L 43/0847* (2013.01)

(58) Field of Classification Search
CPC .............. H04L 12/437; H04L 41/0654; H04L 43/0847; H04L 43/0811; H04L 41/0686; H04L 41/022; H04L 12/40; H04L 12/413; H04B 7/14; H04B 7/15592; G07C 5/085; H04J 3/0673

See application file for complete search history.

(56) References Cited

U.S. PATENT DOCUMENTS

| | | | | |
|---|---|---|---|---|
| 7,760,702 | B2 * | 7/2010 | Deng | ................. H04B 7/15592 370/351 |
| 2012/0069742 | A1 * | 3/2012 | Kaufmann | ............ H04L 41/022 370/242 |
| 2012/0197481 | A1 * | 8/2012 | Takeda | ................... G07C 5/085 701/32.7 |
| 2015/0312121 | A1 | 10/2015 | Yasuda et al. | |
| 2016/0344601 | A1 * | 11/2016 | Kaku | ..................... H04L 12/413 |
| 2017/0041161 | A1 * | 2/2017 | Kaku | .................. H04L 43/0847 |
| 2017/0150464 | A1 * | 5/2017 | Kazehaya | ............. H04J 3/0673 |
| 2017/0170951 | A1 * | 6/2017 | Ito | ........................... H04L 12/40 |

* cited by examiner

*Primary Examiner* — Huy D Vu
*Assistant Examiner* — Robert Ma
(74) *Attorney, Agent, or Firm* — Posz Law Group, PLC

(57) ABSTRACT

A relay device, connected to another relay device by a communication line, includes: multiple ports having two redundant ports connected to communication lines for providing redundant transfer paths between relay devices; a disruption determination unit determining whether a frame transmitted from a target relay device and received through one of the redundant ports is disrupted; an abnormality transmitter transmitting an abnormality detection frame to the target relay device when the frame is disrupted; a response receiver determining whether a response frame is received from the target relay device after the abnormality transmitter transmits the abnormality detection frame; and an abnormality determination unit determining that an abnormality occurs in one of the communication lines between the target relay device and the relay device when the response frame is not received.

7 Claims, 6 Drawing Sheets

FIG. 3

| P1 | | P2 | | P3 | P4 |
|---|---|---|---|---|---|
| MAC ADDRESS | NUMBER OF HOPS | MAC ADDRESS | NUMBER OF HOPS | MAC ADDRESS | MAC ADDRESS |
| AD17 | 1 | AD17 | 3 | AD15 | AD16 |
| AD18 | 1 | AD18 | 3 | | |
| AD19 | 2 | AD19 | 2 | | |
| AD20 | 2 | AD20 | 2 | | |
| AD21 | 3 | AD21 | 1 | | |
| AD22 | 3 | AD22 | 1 | | |

FIG. 4

| P1 | | P2 | | P3 | P4 |
|---|---|---|---|---|---|
| MAC ADDRESS | NUMBER OF HOPS | MAC ADDRESS | NUMBER OF HOPS | MAC ADDRESS | MAC ADDRESS |
| AD15 | 1 | AD15 | 3 | AD17 | AD18 |
| AD16 | 1 | AD16 | 3 | | |
| AD19 | 3 | AD19 | 1 | | |
| AD20 | 3 | AD20 | 1 | | |
| AD21 | 2 | AD21 | 2 | | |
| AD22 | 2 | AD22 | 2 | | | ns
RELAY DEVICE

CROSS REFERENCE TO RELATED APPLICATION

The present application claims the benefit of priority from Japanese Patent Application No. 2019-60903 filed on Mar. 27, 2019. The entire disclosure of the above application is incorporated herein by reference.

TECHNICAL FIELD

The present disclosure relates to a relay device configuring a communication network.

BACKGROUND

For example, in an Ethernet network, a ring-type topology is formed by connecting Ethernet switches (hereinafter referred to as switches) in a ring shape. Ethernet is a registered trademark. In the case of the ring topology, the multiple switches are connected to each other in a ring shape by connecting two of ports of each switch to ports of other switches. The multiple switches and a communication line connecting the switches to each other configure a ring-shaped communication path capable of going around the frame (hereinafter referred to as a ring-shaped communication path). In addition, the ring-shaped communication path can be used as a two-system communication path that enables each switch to transmit a frame in either a clockwise (that is, clockwise) direction or a counterclockwise (that is, counterclockwise) direction.

SUMMARY

According to an example embodiment, a relay device, connected to another relay device by a communication line, includes: multiple ports having two redundant ports connected to communication lines for providing redundant transfer paths between relay devices; a disruption determination unit determining whether a frame transmitted from a target relay device and received through one of the redundant ports is disrupted; an abnormality transmitter transmitting an abnormality detection frame to the target relay device when the frame is disrupted; a response receiver determining whether a response frame is received from the target relay device after the abnormality transmitter transmits the abnormality detection frame; and an abnormality determination unit determining that an abnormality occurs in one of the communication lines between the target relay device and the relay device when the response frame is not received.

BRIEF DESCRIPTION OF THE DRAWINGS

The above and other objects, features and advantages of the present disclosure will become more apparent from the following detailed description made with reference to the accompanying drawings. In the drawings:

FIG. 3 is a first illustrative diagram illustrating an example of a MAC address table;

FIG. 4 is a second illustrative diagram illustrating an example of the MAC address table;

DETAILED DESCRIPTION

Figure 1:
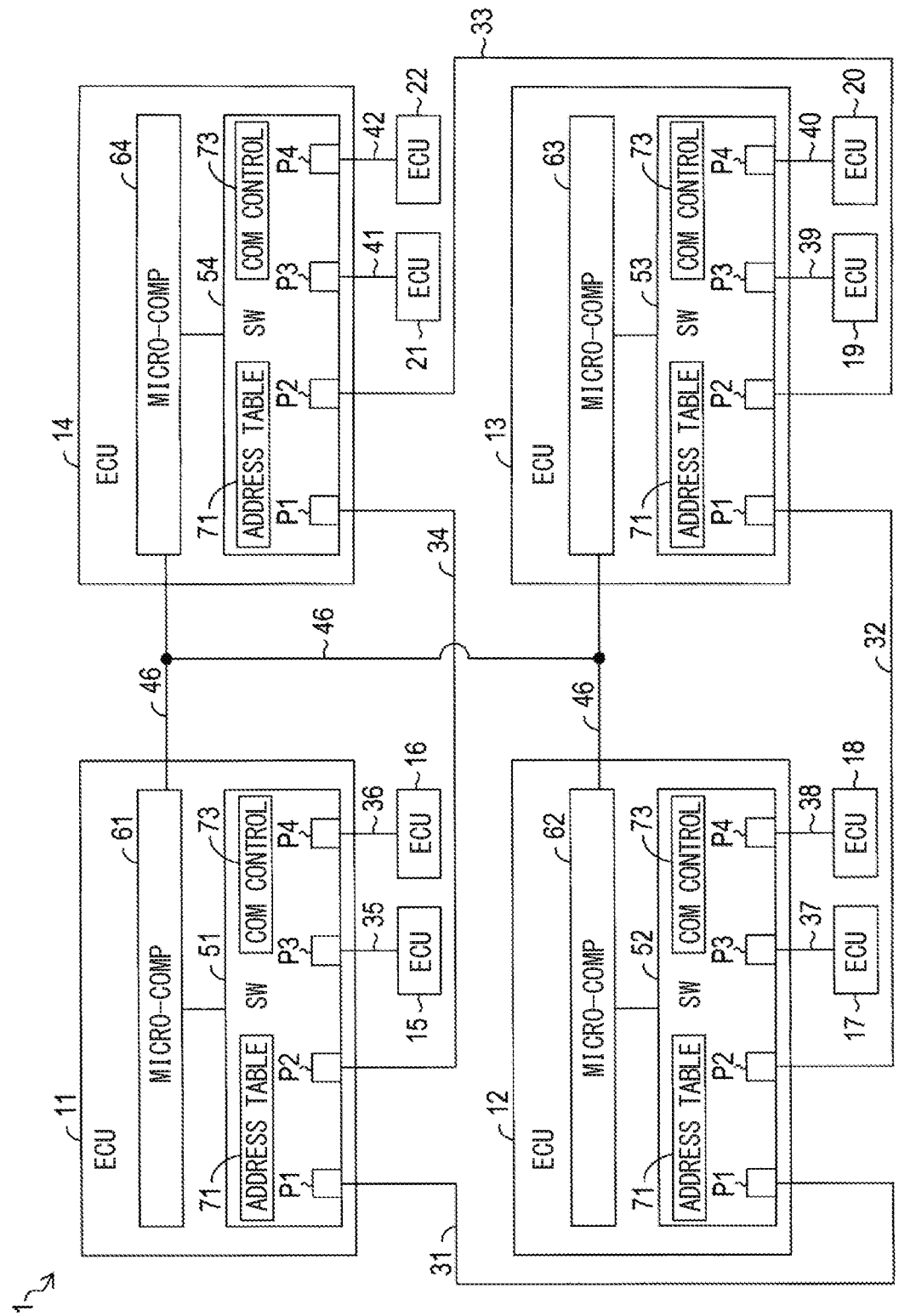
FIG. 1 is a block diagram showing a configuration of a communication network.

In a conceivable communication network, a master switch, which is one of the multiple switches connected in a ring shape, transmits an abnormality detection frame from one of two ports used for the ring-shaped connection at fixed time intervals. Then, a slave switch, which is another switch, transfers the received abnormality detection frame to a switch of a next stage. Further, when determining that the frame from another switch cannot be received, each switch identifies that the communication path immediately before the switch is abnormal in a frame circulation direction, and transmits an abnormality notification frame including the ID of the switch to the switch of the next stage. As a result, the communication network identifies an abnormal section of the communication path.

However, in the above conceivable technique, in order to detect an abnormality in the communication path at an early stage, there is a need to shorten the above-mentioned fixed time for periodically transmitting the abnormality detection frame. As a result, a frequency of transmission of the abnormality detection frame on the ring-shaped communication path increases, and there is a possibility that the normal frame storing the normal data cannot be transmitted on the ring-shaped communication path.

Thus, the occurrence of a situation in which a normal frame cannot be transmitted is inhibited.

According to an example embodiment, a relay device connected to at least another one of a plurality of relay devices by a communication line, includes: a plurality of ports in which at least two of the ports are redundant ports connected to a plurality of the communication lines for providing a plurality of redundant transfer paths between the relay devices; a disruption determination unit that is configured to determine whether a frame transmitted from a target relay device that is one of the relay devices different from the relay device and received through one of the redundant ports of the relay device is disrupted; an abnormality transmitter that is configured to transmit an abnormality detection frame to the target relay device when the disruption determination unit determines that the frame is disrupted; a response receiver that is configured to determine whether a response frame is received from the target relay device after the abnormality transmitter transmits the abnormality detection frame; and an abnormality determination unit that is configured to determine that an abnormality occurs in one of the communication lines between the target relay device and the relay device when the response receiver determines that the response frame is not received.

Since the relay device of the present disclosure configured as described above transmits the abnormality detection frame when the frame is disrupted, the frequency of transmission of the abnormality detection frame through the multiple communication lines connected to the redundant ports can be reduced. For that reason, the relay device according to the present disclosure can inhibit the occurrence of a situation in which a normal frame in which normal data is stored cannot be transmitted through the multiple communication lines connected to the redundant port.

Embodiments of the present disclosure will be described below with reference to the drawings.

A communication network 1 according to the present embodiment is, for example, an Ethernet network mounted on a vehicle such as a passenger car, and as shown in FIG. 1, the communication network 1 includes electronic control units (hereinafter referred to as ECUs) 11 to 22 and communication lines 31 to 42. The ECU is an abbreviation for Electronic Control Unit.

The ECUs 11 12, 13, and 14 includes Ethernet switches 51, 52, 53, and 54, respectively. The Ethernet switches 51 to 54 are network switches having a function of relaying a communication between the other ECUs 15 to 22.

The ECUs 11 12, 13, and 14 further include microcomputers 61, 62, 63, and 64, respectively. The microcomputers 61 to 64 include a CPU, a ROM, a RAM, and the like (not shown). Various functions of the microcomputers 61 to 64 are realized by allowing the CPU to execute a program stored in a non-transitory tangible recording medium. In this example, the ROM corresponds to a non-transitory tangible recording medium in which the program is stored. A method corresponding to the program is executed by executing the program. The number of microcomputers configuring the ECUs 11 to 14 may be one or multiple.

The switches 51 to 54 are, for example, layer 2 switches, and perform a communication for relaying in accordance with the Ethernet standard. For that reason, the switch 51 includes ports P1, P2, P3, and P4 for transmitting and receiving frames, a MAC address table 71, and a communication control unit 73 for performing a communication processing for relaying according to the Ethernet standard. Like the switch 51, the switches 52, 53, and 54 include ports P1, P2, P3, and P4, a MAC address table 71, and a communication control unit 73. The operations of the switches 51 to 54 are realized by the communication control unit 73.

The communication control unit 73 is an electronic control device mainly configured by a microcomputer including a CPU, a ROM, a RAM, and the like. Various functions of the microcomputer are realized by allowing the CPU to execute a program stored in a non-transitory tangible recording medium. In this example, the ROM corresponds to a non-transitory tangible recording medium in which the program is stored. A method corresponding to the program is executed by executing the program. A part or all of the functions executed by the CPU may be configured as hardware by one or multiple ICs or the like. The number of microcomputers configuring the communication control unit 73 may be one or multiple.

In the communication network 1, the port P1 of the switch 51 of the ECU 11 and the port P1 of the switch 52 of the ECU 12 are connected to each other by the communication line 31, and the port P2 of the switch 52 of the ECU 12 and the port P1 of the switch 53 of the ECU 13 are connected to each other by the communication line 32. Further, the port P2 of the switch 53 of the ECU 13 and the port P2 of the switch 54 of the ECU 14 are connected to each other by the communication line 33, and the port P1 of the switch 54 of the ECU 14 and the port P2 of the switch 51 of the ECU 11 are connected to each other by the communication line 34.

The ECUs 15 and 16 are connected to the ports P3 and P4 of the switch 51 of the ECU 11 through the communication lines 35 and 36, respectively, and ECUs 17 and 18 are connected to the ports P3 and P4 of the switch 52 of the ECU 12 through the communication lines 37 and 38, respectively.

The ECUs 19 and 20 are connected to the ports P3 and P4 of the switch 53 of the ECU 13 through the communication lines 39 and 40, respectively, and the ECUs 21 and 22 are connected to the ports P3 and P4 of the switch 54 of the ECU 14 through the communication lines 41 and 42, respectively.

In other words, the switches 51 to 54 are connected in a ring shape by connecting the ports P1 and P2 of each switch to the ports P1 and P2 of the other switches. The ring shape is also a loop shape. Among the ports P1 to P4 of the switches 51 to 54, the ports P3 and P4 that are not used for ring-shaped connections are connected to the ECUs 15 to 22 as communication nodes.

For that reason, as the communication path between the switches 51 to 54, for example, when the switch 51 is set as a starting point, a counterclockwise communication path, which is a direction from the switch 51 to the switch 52, and a counterclockwise communication path, which is a direction from the switch 51 to the switch 54, exist. The two communication paths can function as two communication paths for a communication between the ECUs connected to the different switches 51 to 54 among the ECUs 15 to 22.

In the following description, among the ports P1 to P4 of the switches 51 to 54, the ports P1 and P2 used for the ring-shaped connection are also referred to as ring ports. The ports P3 and P4 that are not ring ports (that is, ports that are not used for ring connection) are also referred to as normal ports.

The microcomputers 61 to 64 are connected through the CAN communication line 46 so as to be able to perform a data communication with each other, and transmit and receive data in accordance with the CAN communication protocol. The CAN is an abbreviation for Controller Area Network. The CAN is a registered trademark.

Figure 2:
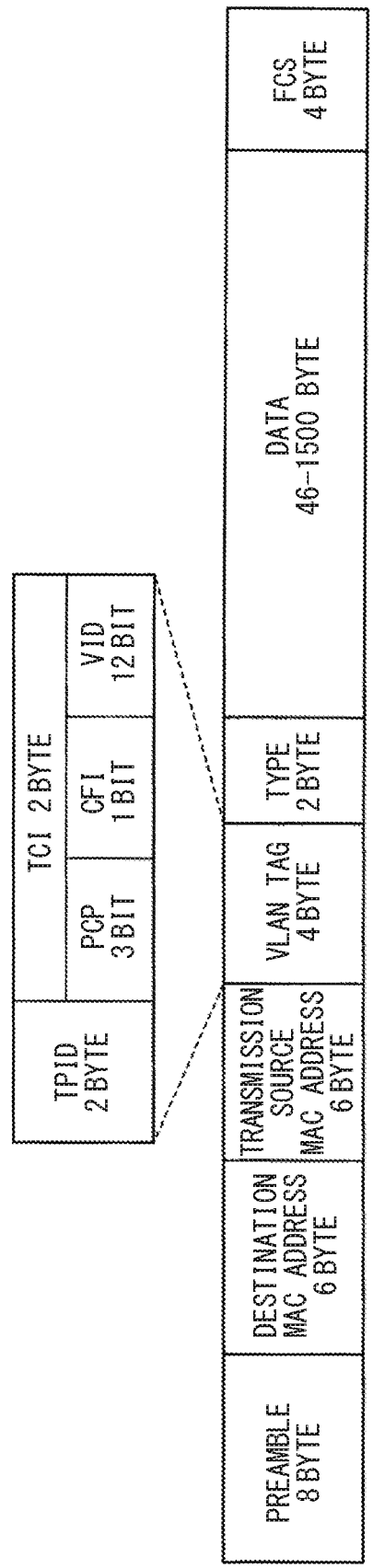
FIG. 2 is an illustrative diagram showing a configuration of an Ethernet frame.

A frame communicated in the communication network 1, for example, as shown in FIG. 2, includes a preamble area, a destination MAC address area, a source MAC address area, a VLAN tag area, a type area, a data area and an FCS area. The MAC is an abbreviation for Media Access Control. The VLAN is an abbreviation for Virtual Local Area Network. The FCS is an abbreviation for Frame Check Sequence.

The destination MAC address area stores a MAC address of the destination device of the frame (hereinafter referred to as a destination MAC address). The source MAC address area is a MAC address of the source device of the frame (hereinafter referred to as a source MAC address).

In the VLAN tag area, a TPID is placed in an area of first half 2 bytes, and a TCI is placed in an area of second half 2 bytes. The TCI includes a 3-bit PCP, a 1-bit CFI, and a 12-bit VID. In the present embodiment, for example, the VID in the VLAN tag area is used as an area for storing abnormality detection frame identification information, which will be described later. The TPID is an abbreviation for Tag Protocol Identifier. The TCI is an abbreviation for Tag Control Information. The PCP is an abbreviation for Priority Code Point. The CFI is an abbreviation for Canonical Format Indicator. The VID is an abbreviation for VLAN Identifier.

On the other hand, in the MAC address table 71 of each of the switches 51 to 54, the MAC address of the device connected to the end of the port is registered for each of the ports in the switch. When it is assumed that the number allocated to the ECU as symbol is "n", the MAC address of the ECUn is referred to as "ADn" in the following description, FIGS. 3 and 4.

For example, as shown in FIG. 3, in the MAC address table 71 of the switch 51, "AD15" which is the MAC address of the ECU 15 is registered for the normal port P3, and "AD16" which is MAC address of the ECU 16 is registered for the normal port P4. For each of the ring ports P1 and P2, "AD17" to "AD22", which are the MAC addresses of the ECUs 17 to 22 connected to the normal ports P3 and P4 of the other switches 52 to 54, are registered. This is because the ECUs 17 to 22 are connected to the ends of the ring ports P1 and P2 of the switch 51 through the other switches 52 to 54.

For example, as shown in FIG. 4, in the MAC address table 71 of the switch 52, "AD17" which is the MAC address of the ECU 17 is registered in the normal port P3, and "AD18" which is the MAC address of the ECU 18 is registered in the normal port P4. For each of the ring ports P1 and P2, "AD15", "AD16", and "AD19" to "AD22" which are the MAC addresses of the ECUs 15, 16, and 19 to 22 connected to the normal ports P3 and P4 of the other switches 51, 53, and 54 are registered.

Further, in the MAC address table 71 of each of the switches 51 to 54, the number of hops is also registered for each of the ring ports P1 and P2 as additional information for the MAC address. The number of hops is information indicating the number of other switches through which a frame transmitted from the ring port of the switch reaches the destination ECU. The destination ECU in this case is an ECU of a MAC address registered in the MAC address table 71 in association with the number of hops.

For example, as shown in FIG. 3, "1" is registered as the number of hops for "AD17" and "AD18" registered for the ring port P1 in the MAC address table 71 of the switch 51. This is because one switch 52 of the switches 51 to 54 connected in a ring shape exists in the communication path from the ring port P1 of the switch 51 to the ECU 17 port or the ECU 18 port. On the other hand, "3" is registered as the number of hops for "AD17" and "AD18" registered for the ring port P2. This is because three switches 52 to 54 among the switches 51 to 54 connected in a ring shape exist in the communication path extending from the ring port P2 of the switch 51 to the ECU 17 port or the ECU 18 port.

In the MAC address table 71 of the switch 51, "3" is registered as the number of hops for "AD21" and "AD22" registered for the ring port P1. This is because three switches 52 to 54 exist in the communication path extending from the ring port P1 of the switch 51 to the ECU 21 or the ECU 22. On the other hand, "1" is registered as the number of hops for "AD21" and "AD22" registered for the ring port P2. This is because one switch 54 exists in the communication path extending from the ring port P2 of the switch 51 to the ECU 21 or the ECU 22.

In the MAC address table 71 of the switch 51, "2" is registered as the number of hops for the "AD19" and the "AD20" registered for the ring port P1. This is because two switches 52 and 53 exist in the communication path extending from the ring port P1 of the switch 51 to the ECU 19 or the ECU 20. Then, "2" is also registered as the number of hops for the "AD19" and the "AD20" registered for the ring port P2. This is because two switches 53 and 54 exist in the communication path extending from the ring port P2 of the switch 51 to the ECU 19 or the ECU 20.

The communication control unit 73 of each of the switches 51 to 54 has the following frame transfer function.

When a frame is received from any of the ports P1 to P4 of the switch, the communication control unit 73 determines a transfer destination port of the received frame (hereinafter referred to as received frame) based on the destination MAC address in the received frame and the MAC address table 71.

Specifically, the communication control unit 73 determines whether or not the same MAC address as the destination MAC address in the received frame is registered in the MAC address table 71 for the ports other than the port at which the frame is received, among the ports P1 to P4. If the same MAC address as the destination MAC address in the received frame is registered, the communication control unit 73 determines the port in which the MAC address is registered as the transfer destination port in the MAC address table 71. When the same MAC address as the destination MAC address in the received frame is not registered in the MAC address table 71, the communication control unit 73 determines all the ports other than the port at which the frame is received as the transfer destination port. Then, the communication control unit 73 transmits the received frame from the port determined as the transfer destination.

When a frame has been received from any of the ports P1 to P4, the communication control unit 73 of each of the switches 51 to 54 registers the number of the port at which the frame is received and the source MAC address in the received frame in association with each other in the MAC address table 71. This function is a general MAC address learning function.

For that reason, in each of the switches 51 to 54, when a frame is received from one of the normal ports P3 and P4, the source MAC address in the frame is registered in the MAC address table 71 for the port at which the frame is received. For example, when the ECU 15 connected to the port P3 of the switch 51 transmits the frame, as shown in FIG. 3, the MAC address of the ECU 15 for the port P3 is registered in the MAC address table 71 of the switch 51.

In the communication network 1 configured as described above, the communication control unit 73 of each of the ECUs 11 to 14 executes an abnormality detection process, an abnormality response process, and a frame transmission process, which will be described later.

First, the procedure of the abnormality detection processing will be described. The abnormality detection process is a process repeatedly executed during the operation of the ECUs 11 to 14. The abnormality detection process is executed for each of the two adjacent relay devices. The adjacent relay devices are two relay devices connected directly to each of the multiple relay devices connected in a ring shape. For example, the adjacent relay devices of the ECU 11 are the ECU 12 and the ECU 14. Similarly, the adjacent relay devices of the ECU 12 are the ECU 11 and the ECU 13. The adjacent relay devices of the ECU 13 are the ECU 12 and the ECU 14. The adjacent relay devices of the ECU 14 are the ECU 11 and the ECU 13.

For that reason, for example, the communication control unit 73 of the ECU 11 executes the abnormality detection process corresponding to the ECU 12 and the abnormality detection process corresponding to the ECU 14. The abnormality detection process corresponding to the ECU 12 executed by the communication control unit 73 of the ECU 11 and the abnormality detection process corresponding to the ECU 14 may be executed separately.

Figure 5:
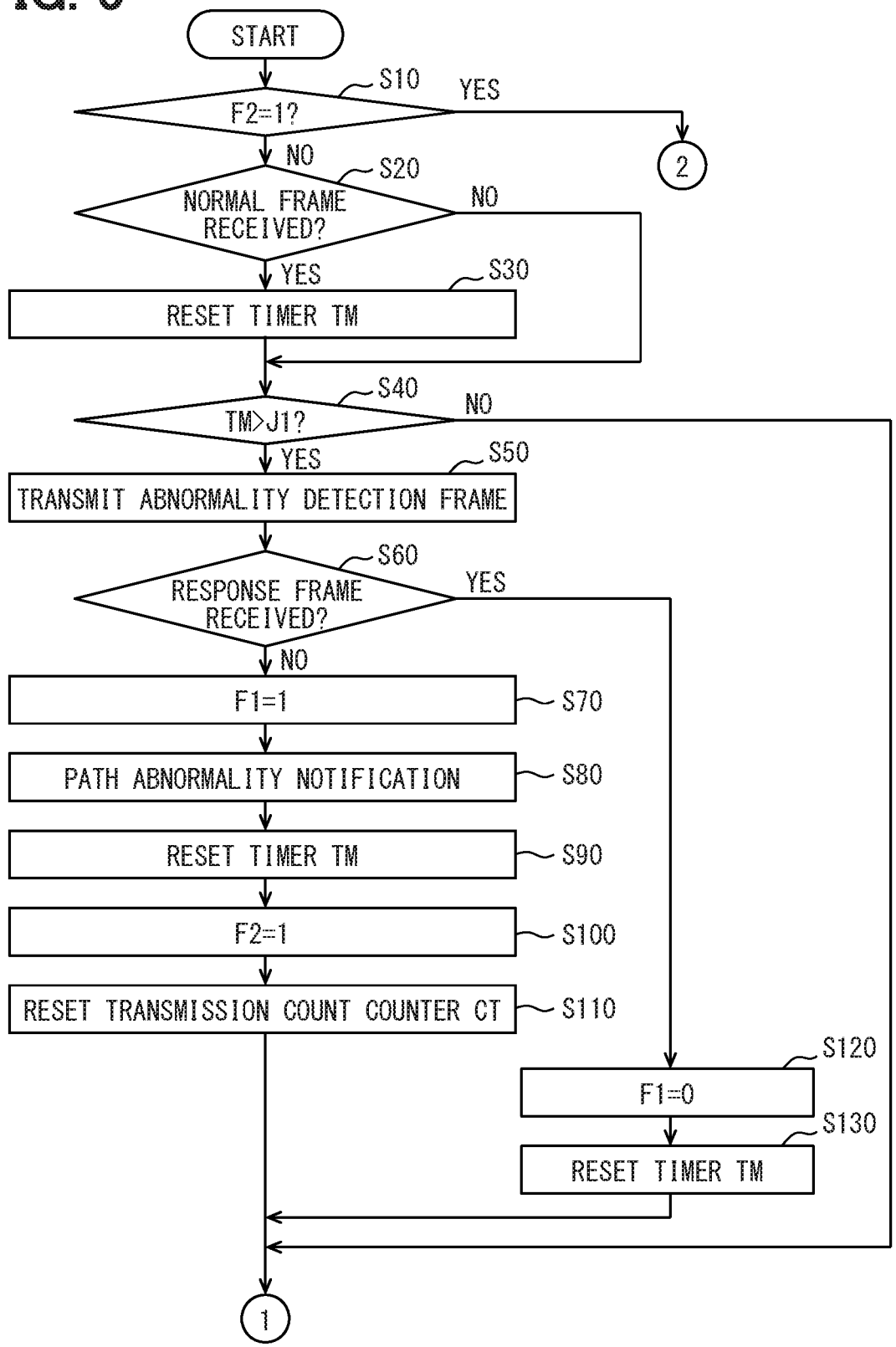
FIG. 5 is a flowchart showing a first half of an abnormality detection process.

When the abnormality detection process is executed, the communication control unit 73 first determines in S10 whether or not a continuation flag F2 provided in the RAM is set, as shown in FIG. 5. In the following description, setting a flag indicates that a value of the flag is set to 1, and clearing the flag indicates that the value of the flag is set to 0.

If the continuation flag F2 is cleared, the communication control unit 73 determines in S20 whether or not a normal frame has been received from any adjacent relay devices. The normal frame is a frame transmitted and received by the ECUs 11 to 22 for controlling the vehicle, and is a frame other than an abnormality detection frame and a response frame, which will be described later. The normal frame is, for example, a frame including image data and audio data.

If the normal frame has not been received from the adjacent relay device, the communication control unit 73 proceeds to S40. On the other hand, when the normal frame has been received, the communication control unit 73 resets a timer TM provided in the RAM (that is, sets the timer TM to 0) in S30, and proceeds to S40. The timer TM is a timer that increments (that is, adds 1) every 1 ms, for example.

After proceeding to S40, the communication control unit 73 determines whether or not the value of the timer TM exceeds a preset abnormality determination value J1 (for example, a value corresponding to 100 ms). The abnormality determination value J1 is set to a value exceeding the maximum value of the transmission interval of the normal frame.

In this example, when the value of the timer TM is equal to or less than the abnormality determination value J1, the communication control unit 73 temporarily ends the abnormality detection process. On the other hand, when the value of the timer TM exceeds the abnormality determination value J1, the communication control unit 73 transmits an abnormality detection frame to the adjacent relay devices in S50. The abnormality detection frame identification information is stored in the above-mentioned VID of the abnormality detection frame.

Then, in S60, the communication control unit 73 determines whether or not a response frame has been received from any adjacent relay device. If the response frame has not been received from the adjacent relay device, the communication control unit 73 sets the abnormality flag F1 provided in the RAM in S70. Further, in S80, the communication control unit 73 causes the microcomputer (that is, any one of the microcomputers 61, 62, 63, and 64) to transmit a path abnormality notification indicating that an abnormality has occurred in the communication line between the relay device mounting the communication control unit 73 that executes the abnormality detection process and the adjacent relay devices to another relay device through the CAN communication line 46. For example, when the relay device that executes the abnormality detection process is the ECU 13 and the adjacent relay device is the ECU 12, the ECU 13 transmits the path abnormality notification indicating that an abnormality has occurred on the communication line 32 to the ECUs 11, 12, and 14.

In S90, the communication control unit 73 resets the timer TM. In S100, the communication control unit 73 sets a continuation flag F2. Further, in S110, the communication control unit 73 resets a transmission count counter CT provided in the RAM, and ends the abnormality detection process once.

If a response frame has been received from the adjacent relay device in S60, the communication control unit 73 clears the abnormality flag F1 in S120. Then, in S130, the communication control unit 73 resets the timer TM, and ends the abnormality detection process once.

Figure 6:
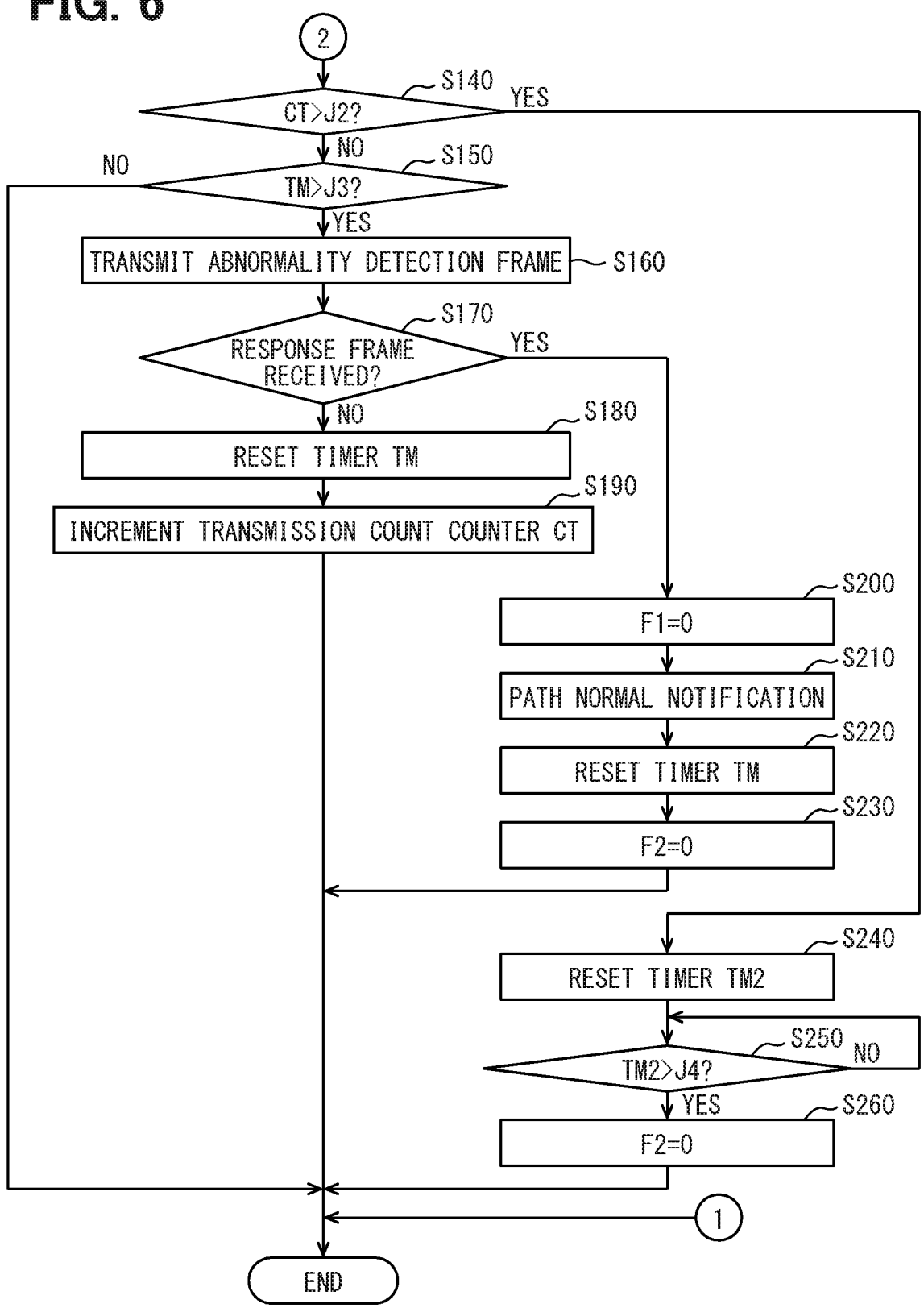
FIG. 6 is a flowchart showing a second half of the abnormality detection process.

When the continuation flag F2 is set in S10, the communication control unit 73 determines whether or not the value of the transmission count counter CT exceeds a preset transmission end determination value J2 in S140, as shown in FIG. 6. In this example, when the value of the transmission count counter CT is equal to or less than the transmission end determination value J2, the communication control unit 73 determines whether or not the value of the timer TM exceeds a preset abnormality transmission determination value J3 in S150. The abnormality transmission determination value J3 is set to be smaller than the abnormality determination value J1.

In this example, when the value of the timer TM exceeds the abnormality transmission determination value J3, the communication control unit 73 transmits the abnormality detection frame to the adjacent relay device in S160.

Then, in S170, the communication control unit 73 determines whether or not a response frame has been received from the adjacent relay device. If no response frame has been received from the adjacent relay device, the communication control unit 73 resets the timer TM in S180. Further, in S190, the communication control unit 73 increments the transmission count counter CT, and ends the abnormality detection process once.

When the response frame has been received from the adjacent relay device in S170, the communication control unit 73 clears the abnormality flag F1 in S200. Further, in S210, the communication control unit 73 causes the microcomputer (that is, any one of the microcomputers 61, 62, 63, and 64) to transmit a path normal status notification indicating that the communication lines between the relay device mounting the communication control unit 73 that executes the abnormality detection process and the adjacent relay devices are normal to another relay device through the CAN communication line 46.

In S220, the communication control unit 73 resets the timer TM. Further, in S230, the communication control unit 73 clears the continuation flag F2, and ends the abnormality detection process once.

When the value of the transmission count counter CT exceeds the transmission end determination value J2 in S140, the communication control unit 73 resets the timer TM2 provided in the RAM (that is, sets TM2 to 0) in S240, and proceeds to S250. The timer TM2 is a timer that increments (that is, increments by 1) for each 1s, for example. After proceeding to S250, the communication control unit 73 determines whether or not the value of the timer TM2 exceeds a preset abnormality detection stop determination value J4. The abnormality detection stop determination value J4 is set to be sufficiently larger than the abnormality determination value J1 and the abnormality transmission determination value J3. If the value of the timer TM2 is equal to or less than the abnormality detection stop determination value J4, the communication control unit 73 repeats S250. On the other hand, when the value of the timer TM2 exceeds the abnormality detection stop determination value J4, the communication control unit 73 clears the continuation flag F2 in S260, and ends the abnormality detection process once.

Next, the procedures of the abnormality response process executed by the communication control unit 73 in each of the ECUs 11 to 14 will be described. The abnormality response process is a process repeatedly executed during the operation of the ECUs 11 to 14.

Figure 7:
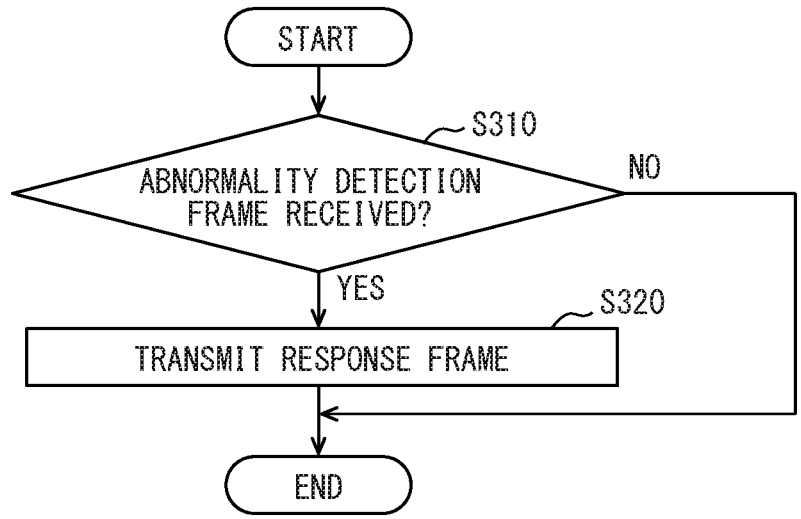
FIG. 7 is a flowchart showing an abnormality response process.

Upon execution of the abnormality response process, as shown in FIG. 7, the communication control unit 73 first determines whether or not the abnormality detection frame has been received from the adjacent relay device in S310. If the abnormality detection frame has not been received, the communication control unit 73 ends the abnormality response process once. On the other hand, when the abnormality detection frame has been received, the communication control unit 73 transmits the response frame to the adjacent relay device which is the source of the abnormality detection frame in S320, and ends the abnormality response process once.

Next, the sequence of the frame transmission process executed by the communication control unit 73 in each of the ECUs 11 to 14 will be described. The frame transmission process is a process repeatedly executed during the operation of the ECUs 11 to 14.

Figure 8:
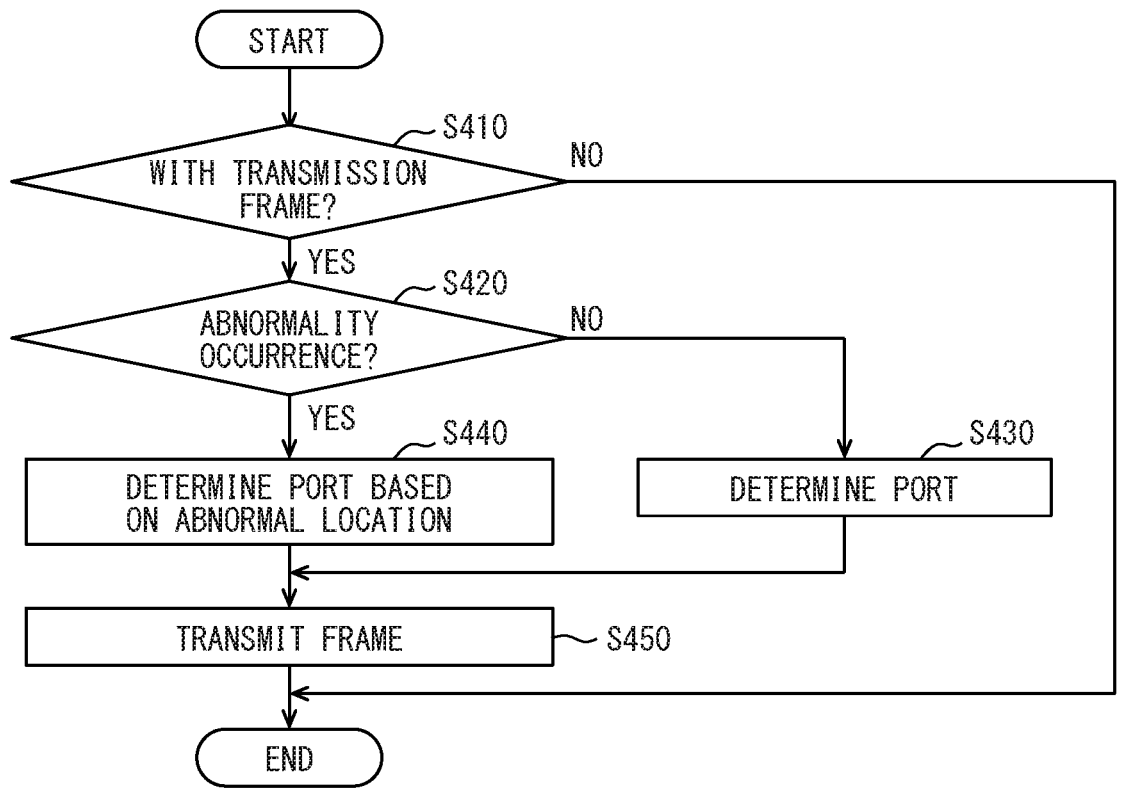
FIG. 8 is a flowchart showing a frame transmission process.

When the frame transmission process has been executed, as shown in FIG. 8, the communication control unit 73 first determines whether or not there is a frame to be transmitted in S410. If there is no frame to be transmitted, the communication control unit 73 ends the frame transmission process once.

On the other hand, when there is a frame to be transmitted, the communication control unit 73 determines whether or not an abnormality has occurred in the communication line in S420. Specifically, the communication control unit 73 identifies a communication line in which an abnormality has occurred based on the value of the abnormality flag F1 provided in the RAM of the communication control unit 73 and the path abnormality notification received from another relay device. When the communication control unit 73 identifies the communication line in which the abnormality has occurred, the communication control unit 73 determines that the abnormality has occurred in the communication line. On the other hand, when the communication control unit 73 cannot identify the communication line in which the abnormality has occurred, the communication control unit 73 determines that the abnormality has not occurred in the communication line.

Here, when no abnormality occurs in the communication line, the communication control unit 73 determines the transmission port based on the destination of the frame to be transmitted and the MAC address table 71 in S430, and proceeds to S450.

On the other hand, when an abnormality has occurred in the communication line, the communication control unit 73 determines a transmission port capable of transmitting the frame to the destination on the basis of the communication line in which the abnormality has occurred and the destination of the frame to be transmitted in S440, and proceeds to the S450. For example, it is assumed that the ECU 11 transmits a frame to the ECU 19 when an abnormality occurs in the communication line 32. In this instance, the communication control unit 73 of the ECU 11 determines the transmission port as the ring port P2.

When proceeding to S450, the communication control unit 73 transmits the frame from the transmission port determined in S430 or S440, and ends the frame transmission process once.

The ECU 11 configured as described above is connected to the two ECUs 12 and 14 by the communication lines 31 and 34. Similarly, the ECU 12 is connected to the two ECUs 11 and 13 by the communication lines 31 and 32. The ECU 13 is connected to the two ECUs 12 and 14 by the communication lines 32 and 33. The ECU 14 is connected to the two ECUs 11 and 13 by the communication lines 34 and 33. Among the multiple ports P1, P2, P3, and P4 included in each of the ECUs 11 to 14, two ports P1 and P2 are ring ports.

Each of the ECUs 11 to 14 determines whether or not the normal frame transmitted from the adjacent relay devices and received through the ring ports of the ECUs 11 to 14 is disrupted.

When each of the ECUs 11 to 14 determines that the normal frame is disrupted, each of the ECUs 11 to 14 transmits the abnormality detection frame to the adjacent relay devices.

The ECUs 11 to 14 each determine whether or not a response frame has been received from the adjacent relay devices after transmitting the abnormality detection frame.

When the ECUs 11 to 14 each determine that the response frame has not been received, each of the ECUs 11 to 14 determines that an abnormality has occurred in the communication line between the adjacent relay device and the ECUs 11 to 14.

As described above, since the ECUs 11 to 14 transmit the abnormality detection frame when the normal frame is disrupted, the frequency of transmission of the abnormality detection frame on the communication lines 31 to 34 connected to the ring ports can be reduced. For that reason, the ECUs 11 to 14 can inhibit a situation in which the normal frame in which normal data is stored cannot be transmitted through the communication lines 31 to 34 connected to the ring ports from occurring.

The ECUs 11 to 14 each determine that the normal frame is disrupted when a non-reception time during which the normal frame is not received from the adjacent relay devices exceeds a time corresponding to the abnormality determination value J1 set in advance. The time corresponding to the abnormality determination value J1 is longer than a maximum value of a frame transmission interval of the normal frame, which is a frame for transmitting the normal data. As a result, the ECUs 11 to 14 can easily determine whether or not the normal frame is disrupted.

After having determined that the abnormality has occurred in the communication line, the ECUs 11 to 14 each repeatedly transmit the abnormality detection frame to the adjacent relay devices. Further, the ECUs 11 to 14 each determine whether or not a response frame has been received from the adjacent relay devices after transmitting the abnormality detection frame. Each of the ECUs 11 to 14 determines that the communication line between the adjacent relay devices and the ECUs 11 to 14 is normal when it is determined that the response frame has been received. As a result, even after determining that an abnormality has occurred in the communication line, when the communication line has returned to the normal state, the ECUs 11 to 14 can detect that the communication line has returned to the normal state.

The ECUs 11 to 14 transmit the abnormality detection frame of the number of times corresponding to the preset transmission end determination value J2 every time a time corresponding to the preset abnormality transmission determination value J3 elapses. As a result, the ECUs 11 to 14 can arbitrarily set the number of retransmissions and the retransmission cycle of the abnormality detection frame. In addition, since the abnormality detection process is stopped for a predetermined time after the abnormality detection frames have been transmitted a number of times corresponding to the preset transmission end determination value J2, the processing loads of the ECUs 11 to 14 can be reduced.

When the ECU 11 determines that an abnormality has occurred in the communication line between the adjacent relay devices and the ECU 11, the ECU 11 transmits a path abnormality notification indicating that abnormality has occurred to the relay device other than the ECU 11. In the same manner, when each of the ECUs 12 to 14 determines that an abnormality has occurred in the communication line between the adjacent relay devices and the ECUs 12 to 14, each of the ECUs 12 to 14 transmits a path abnormality notification indicating that abnormality has occurred to the relay devices other than the ECUs 12 to 14. As a result, the ECUs 11 to 14 can notify the relay device configuring the communication network 1 of the information identifying the location where the abnormality occurs in the communication line.

The ECUs 11 to 14 each transmit the path abnormality notification with the use of the CAN communication line 46 which differs from the communication lines 31 to 34. As a result, the ECUs 11 to 14 each can easily transmit the path abnormality notification without considering the place where the abnormality occurs in the communication lines 31 to 34.

The ECUs 11 to 14 each identify an abnormal communication line which is a communication line in which an abnormality has occurred. Then, the ECUs 11 to 14 each transmit the frame while avoiding the identified abnormal communication line. As a result, the ECUs 11 to 14 can inhibit the occurrence of a situation in which a frame cannot be transmitted to the relay devices configuring the communication network 1.

In the embodiment described above, the ECUs 11 to 14 each correspond to a relay device, the ring port corresponds to a redundant port, and the adjacent relay device corresponds to a target relay device.

Further, S40 corresponds to processing as a disruption determination unit, S50 corresponds to processing as an abnormality transmission unit, S60 corresponds to processing as a response receiving unit, and S70 corresponds to processing as an abnormality determination unit.

A time corresponding to the abnormality determination value J1 corresponds to an abnormality determination time, S140 to S160, S180, and S190 correspond to processing as a continuous abnormality transmission unit, S170 corresponds to processing as a continuation response receiving unit, and S200 corresponds to processing as the normal determination unit.

The number of times corresponding to the transmission end determination value J2 corresponds to the number of retransmissions, and the time corresponding to the abnormality transmission determination value J3 corresponds to the retransmission cycle.

In addition, S80 corresponds to processing as an abnormality notification unit, the path abnormality notification corresponds to an abnormality occurrence notification, and the CAN communication line 46 corresponds to a communication path different from the communication line.

S420 corresponds to processing as an abnormality identification unit, and S440 and S450 correspond to processing as an avoidance transmission unit.

Although one embodiment of the present disclosure has been described above, the present disclosure is not limited to the above embodiment, and various modifications can be made to implement the present disclosure.

[Modification 1]

For example, in the above embodiment, the number of ECUs is 12, the number of switches is 4, and the number of ports is 4, but those numbers are examples and other values may be used. The communication protocol may be a protocol other than Ethernet.

[Modification 2]

As shown in FIG. 6, in S140, when the value of the transmission count counter CT exceeds the transmission end determination value J2, the abnormality detection process is stopped in S240 and S250 for a predetermined time (abnormality detection stop determination value J4), however, the present disclosure is not limited to the above example. For example, the abnormality detection process may be stopped until a predetermined operation is performed (for example, when a power supply of the vehicle is turned off and turned on again) instead of S240 and S250.

The ECUs 11 to 14 and the methods described in the present disclosure may be implemented by a dedicated computer provided by configuring a processor and memory programmed to perform one or more functions embodied by a computer program. Alternatively, the ECUs 11 to 14 and the methods described in the present disclosure may be implemented by a dedicated computer provided by configuring a processor with one or more dedicated hardware logic circuits. Alternatively, the ECUs 11 to 14 and the methods described in the present disclosure may be implemented by one or more dedicated computers configured by combinations of processors and memories programmed to perform one or more functions and processors configured by one or more hardware logic circuits. The computer program may also be stored on a computer readable non-transitory tangible recording medium as computer executable instructions. The method for realizing the functions of the respective units included in the ECUs 11 to 14 does not necessarily need to include software, and all of the functions may be realized with the use of one or multiple hardware.

The multiple functions of one component in the above embodiment may be realized by multiple components, or a function of one component may be realized by the multiple components. In addition, multiple functions of multiple components may be realized by one component, or a single function realized by multiple components may be realized by one component. In addition, a part of the configuration of the above embodiment may be omitted. At least a part of the configuration of the above embodiment may be added to or substituted for the configuration of the other above embodiment.

In addition to the ECUs 11 to 14 described above, the present disclosure may be implemented in various forms, such as a system including the ECUs 11 to 14 as a component, a program for causing a computer to function as the ECUs 11 to 14, a non-transitory tangible recording medium such as a semiconductor memory in which the program is recorded, and an abnormality detection method.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A relay device connected to at least another one of a plurality of relay devices by a communication line, the relay device comprising:
   a plurality of ports in which at least two of the ports are redundant ports connected to a plurality of communication lines for providing a plurality of redundant transfer paths between the relay devices; and
   a processor and a memory, the processor and memory functioning as:
      a disruption determination unit that is configured to determine whether a frame transmitted from a target relay device that is one of the relay devices different from the relay device and received through one of the redundant ports of the relay device is disrupted;
      an abnormality transmitter that is configured to transmit an abnormality detection frame to the target relay device when the disruption determination unit determines that the frame is disrupted;
      a response receiver that is configured to determine whether a response frame is received from the target relay device after the abnormality transmitter transmits the abnormality detection frame;
      an abnormality determination unit that is configured to determine that an abnormality occurs in one of the communication lines between the target relay device and the relay device when the response receiver determines that the response frame is not received; and
      an abnormality notification unit configured to transmit an abnormality occurrence notification, indicating that the abnormality occurs, to the at least another one of a plurality of relay devices other than the relay device when the abnormality determination unit determines that the abnormality occurs in the one of the communication lines between the target relay device and the relay device, wherein:
   the abnormality notification unit transmits the abnormality occurrence notification using a communication path having different communication lines from the plurality of communication lines,
   a communication protocol of each of the different communication lines is different from a communication protocol of each of the plurality of communication lines, and
   the abnormality notification unit transmits the abnormality occurrence notification followed by a path normal status notification to the at least another one of the plurality of relay devices via the communication path having the different communication lines from the plurality of communication lines.

2. The relay device according to claim 1, wherein:
   the disruption determination unit determines that the frame is disrupted when a non-reception time during which the frame is not received from the target relay device exceeds a predetermined abnormality determination time; and
   the abnormality determination time is longer than a maximum value of a frame transmission interval of a normal frame, which is the frame for transmitting normal data.

3. The relay device according to claim 1, wherein:
   the processor and memory further function as:
      a continuation abnormality transmitter that is configured to repeatedly transmit the abnormality detection frame to the target relay device after the abnormality determination unit determines that the abnormality occurs in the one of the communication lines;
      a continuation response receiver that is configured to determine whether the response frame is received from the target relay device after the continuation abnormality transmission unit transmits the abnormality detection frame; and
      a normal determination unit that is configured to determine that the one of the communication lines between the target relay device and the relay device is normal when the continuation response receiver determines that the response frame is received.

4. The relay device according to claim 3, wherein:
   the continuation abnormality transmitter transmits the abnormality detection frame a predetermined number of retransmission times every time a predetermined retransmission period elapses.

5. The relay device according to claim 1, wherein:
   the processor and memory further function as:
      an abnormality identification unit configured to identify an abnormal communication line which is the one of the communication lines in which the abnormality occurs; and
      an avoidance transmitter configured to transmit the frame to the relay device by avoiding the abnormal communication line identified by the abnormality identifying unit.

6. The relay device according to claim 1, wherein:
   the path normal notification indicates that the communication lines between the target relay device and the relay device is normal.

7. The relay device according to claim 1, wherein:
   the relay device is connected to the at least another one of the plurality of relay devices in a ring shape, and is further connected to the at least another one of the plurality of relay devices one by one.

* * * * *